June 22, 1948.   C. M. LINDLEY, JR   2,443,863
FRUIT PITTING MACHINE WHEREIN THE FRUIT
ARE CONTINUOUSLY MOVED DURING PITTING
Filed April 28, 1945   5 Sheets-Sheet 1

INVENTOR
C. M. Lindley Jr.
BY
ATTORNEYS

June 22, 1948.  C. M. LINDLEY, JR  2,443,863
FRUIT PITTING MACHINE WHEREIN THE FRUIT
ARE CONTINUOUSLY MOVED DURING PITTING
Filed April 28, 1945   5 Sheets-Sheet 3
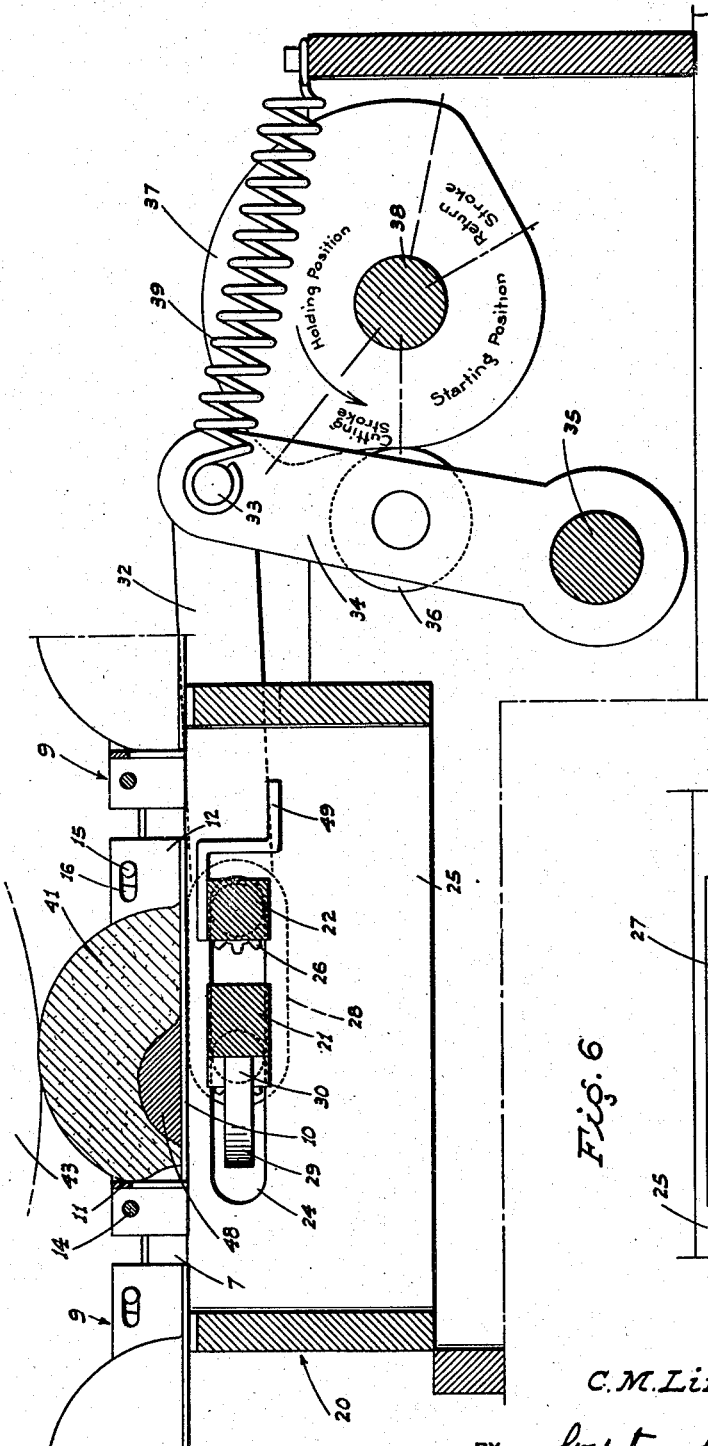
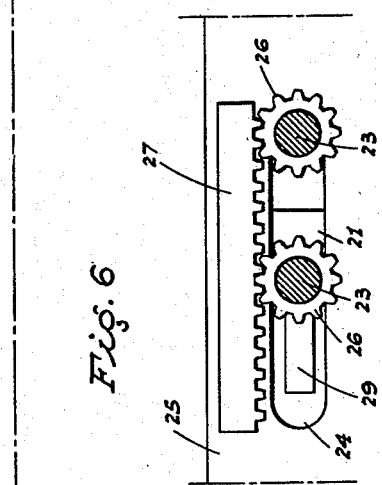
INVENTOR
C. M. Lindley Jr.
BY
ATTORNEYS June 22, 1948.  C. M. LINDLEY, JR  2,443,863
FRUIT PITTING MACHINE WHEREIN THE FRUIT
ARE CONTINUOUSLY MOVED DURING PITTING
Filed April 28, 1945  5 Sheets-Sheet 4
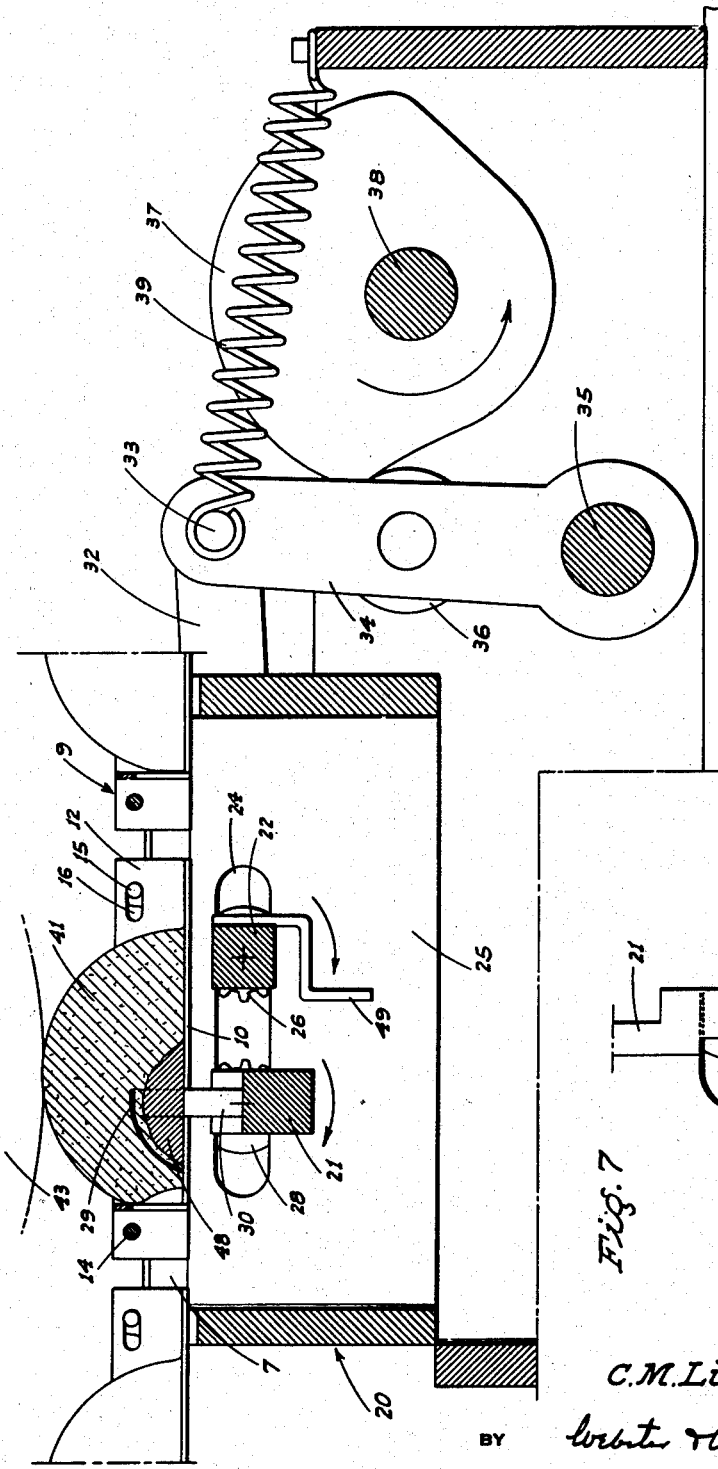
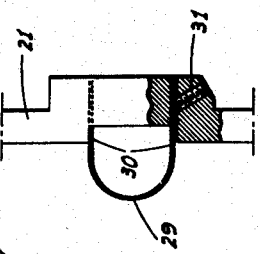
INVENTOR
C. M. Lindley Jr
BY
ATTORNEYS June 22, 1948.
C. M. LINDLEY, JR
2,443,863
FRUIT PITTING MACHINE WHEREIN THE FRUIT
ARE CONTINUOUSLY MOVED DURING PITTING
Filed April 28, 1945
5 Sheets-Sheet 5
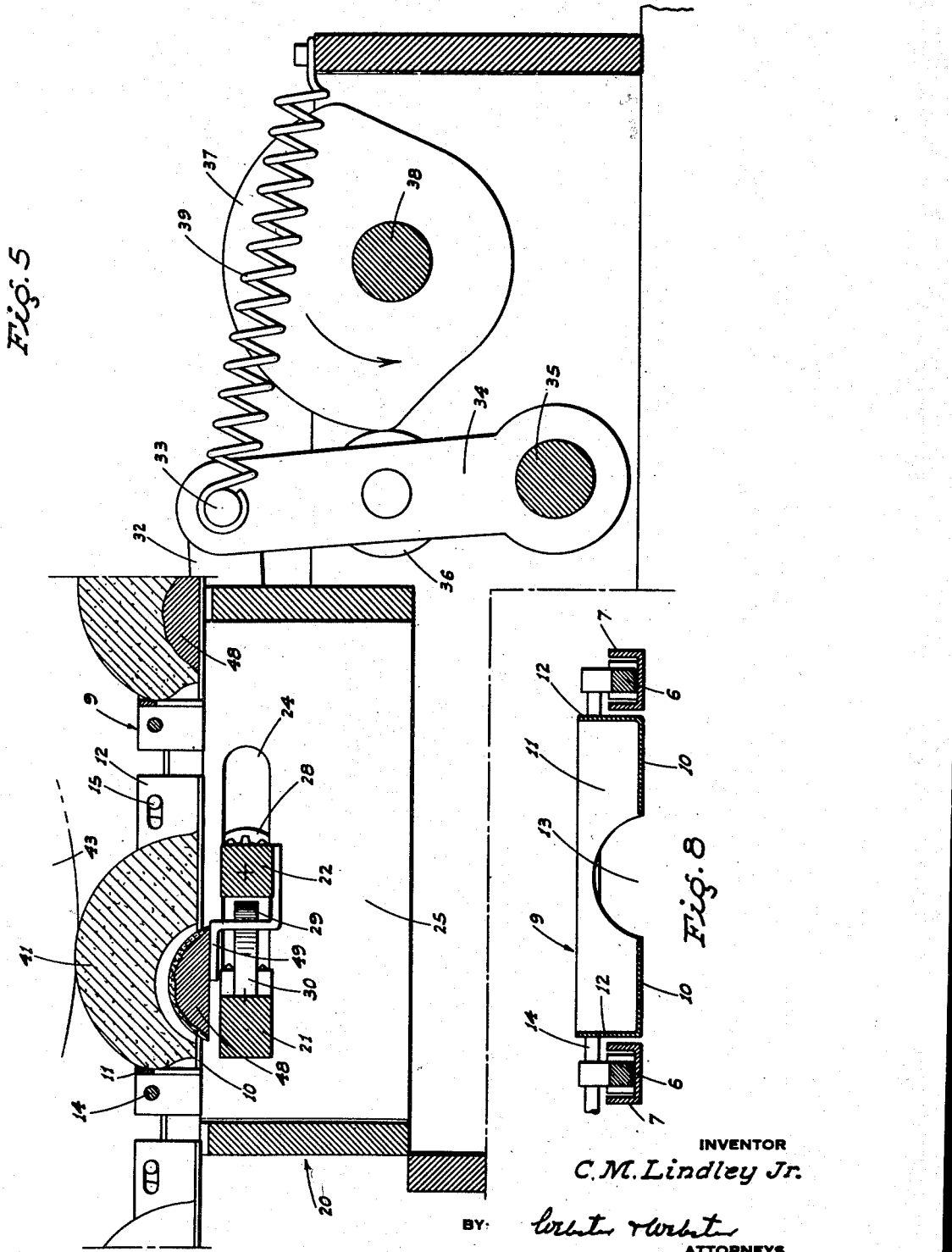
INVENTOR
C. M. Lindley Jr.
BY
ATTORNEYS Patented June 22, 1948

2,443,863

UNITED STATES PATENT OFFICE 2,443,863

FRUIT PITTING MACHINE WHEREIN THE FRUIT ARE CONTINUOUSLY MOVED DURING PITTING

Curtis M. Lindley, Jr., Empire, Calif.

Application April 28, 1945, Serial No. 590,760

5 Claims. (Cl. 146—28)

The present invention is directed generally to automatic machinery used to prepare fresh fruit for processing.

In particular the invention relates to an improved automatic pitting machine for stone fruit, such as peaches; objects of the invention being to provide a machine operative to pit halved fruit while the same are in motion on a conveyor; to pit such halved fruit with a minimum of flesh loss; and to pit the fruit from the stem end of the fruit toward the blossom end whereby to facilitate the pitting operation and to make possible its accomplishment with the fruit halves in motion as above.

An additional object of the instant invention is to provide an automatic, fruit pitting machine which includes a novel cam actuated pitting knife mechanism; said mechanism including an arcuate pitting knife mounted and actuated so that on the pitting stroke of said knife, which is lengthwise of, but contra to, the direction of advance of the fruit halves, the pitting knife is likewise advanced in timed, speed compensating relation to the fruit halves whereby the knife strokes through the flesh of the halves with a substantially semi-circular cut and close to the pit. This is very advantageous, as it produces a clean pitting cut without elongation, and assures against any substantial flesh loss.

A further object of the invention is to provide a novel fruit half conveyor, and hold-down mechanism, in the machine; such conveyor and hold-down mechanism operating in carefully timed relation to the pitting knife mechanism whereby to firmly position each fruit half for the pitting operation.

A further object of the invention is to produce a fruit machine which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 3 is an enlarged fragmentary sectional elevation on line 3—3 of Fig. 2; the pitting knife mechanism being shown in starting position.

Figure 4 is a view similar to Fig. 3, but shows the pitting knife mechanism with the knife in cutting position.

Figure 5 is a view similar to Figs. 3 and 4, but shows the pitting knife mechanism with the knife after completion of the cut and in the holding position which said knife assumes until the adjacent fruit half advances out of its range.

Figure 6 is a fragmentary sectional elevation of the pinion and rack assembly of the pitting knife mechanism.

Figure 7 is a fragmentary plan view, partly in section, of the pitting knife and its mount.

Figure 8 is a fragmentary cross section on line 8—8 of Fig. 2.

Figure 2:
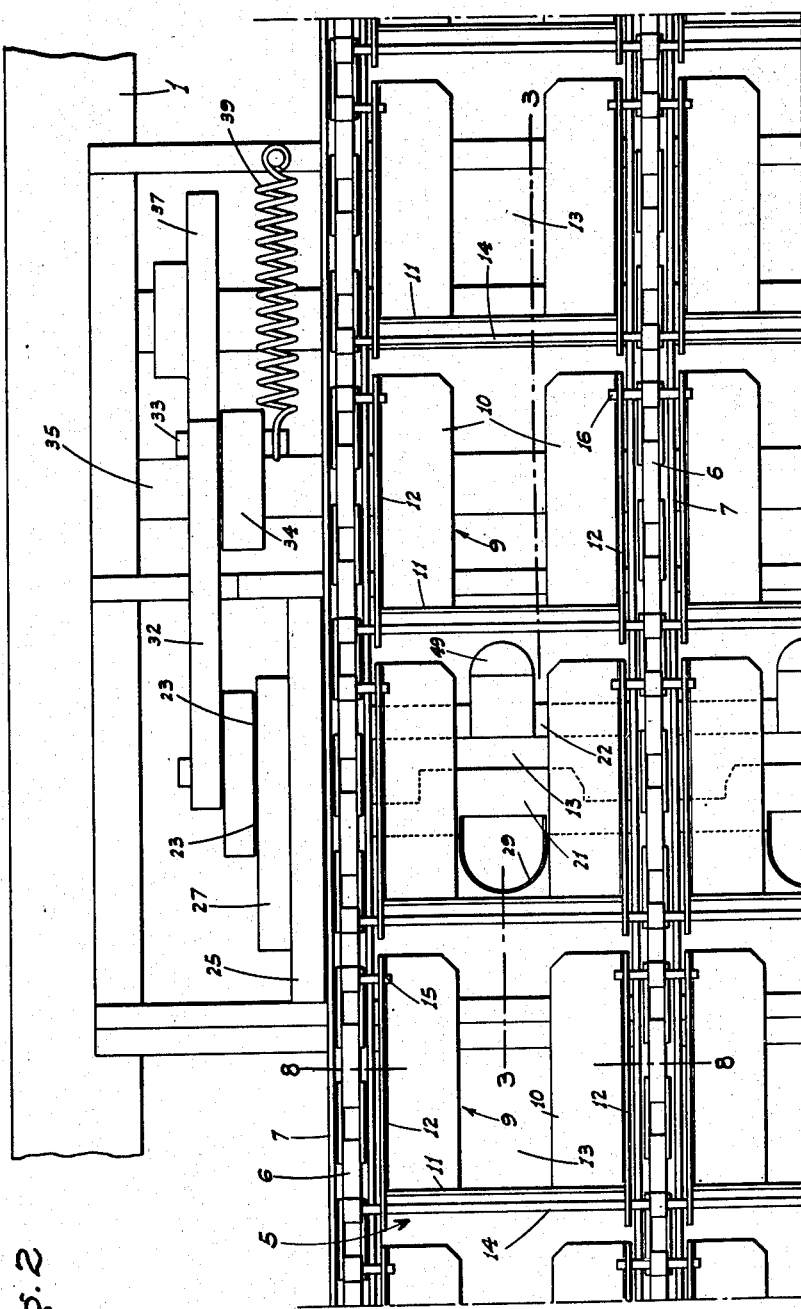
Figure 2 is a fragmentary plan view of the machine.

While the fruit machine as here shown, as in Fig. 2, is of a dual conveyor type, i. e., constructed to handle parallel rows of fruit, the above description of the figures, and the following specification, are in the main in terms of a single conveyor machine, for the purpose of simplicity of description and clarity.

It will be obvious that the invention may be incorporated either in a single conveyor or a multiple conveyor machine, without departing from the essence of such invention.

Referring now more particularly to the characters of reference on the drawings, the fruit pitting machine comprises an upstanding but horizontally elongated frame, indicated generally at 1, which includes horizontal, transversely spaced top and bottom beams 2 and 3, respectively, supported at opposite ends by legs or corner posts 4. The present machine includes a pair of endless conveyors, indicated generally at 5; said conveyors each including a transversely spaced pair of endless chains 6 carried in the upper run in horizontal channels 7, the intermediate chain 6 being common to both conveyors. As the conveyors 5, together with the cooperating pitting knife mechanisms and other parts of the machine, are identical for each conveyor, a description of one of said conveyors and the corresponding pitting knife mechanism and other parts will suffice.

Such conveyor 5 is carried at opposite ends by sprockets 8 mounted on suitable cross shafts, and includes a plurality of longitudinally spaced, fruit-half supporting pans, indicated generally at 9. The pans 9 are substantially rectangular in plan and each include a bottom plate 10, a front wall 11 and upstanding sides 12; the bottom plate 10 being open or slotted centrally and longitudinally for its entire length; the slot being indicated at 13.

The pans are supported at the front by cross rods 14 which extend between the chains 6, and said pans are supported at the rear end by chain pins 15 which project laterally inwardly and ride in slots 16 in the sides 12 of said pans; this slotted arrangement being provided in order that the pans may pass, without binding, about the sprockets 8 at the ends of the conveyor.

Figure 1:
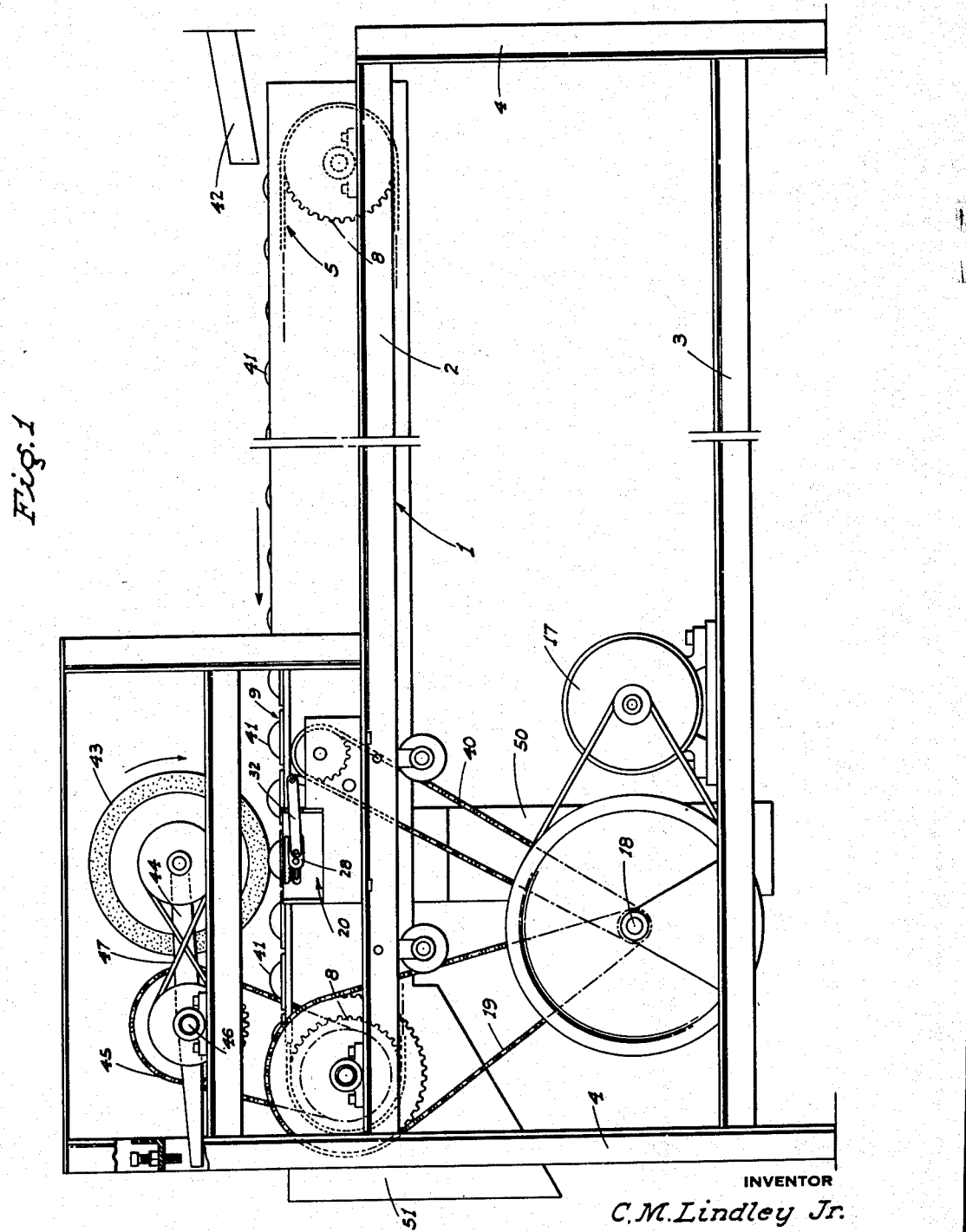
Figure 1 is a side elevation of the fruit pitting machine.

The conveyor 5 is driven at a predetermined speed, with the upper run of said conveyor moving in the direction shown in Fig. 1, by means of a drive mechanism which includes an electric motor 17 connected in speed-reduction relation to a countershaft 18, which in turn drives one of the conveyor cross shafts through the medium of a chain and sprocket unit, indicated generally at 19.

Intermediate the ends of the conveyor and below the same is a pitting knife mechanism, indicated generally at 20, and which pitting knife mechanism is constructed as follows:

A pair of parallel cross bars 21 and 22 are disposed in adjacent but spaced relation and relatively close to the conveyor 5; the cross bar 21 being disposed in advance of the cross bar 22. At the ends the cross bars 21 and 22 are formed with trunnions 23 which project in guided relation through horizontal, longitudinally elongated slots 24 in adjacent end plates 25 on the frame. The height of the slots 24 is substantially the same as the diameter of the trunnions, whereby the latter may shift back and forth lengthwise of the direction of travel of the conveyor, but without any material play.

Outwardly of the end plates 25 the trunnions 23 are fitted with pinions 26 which constantly run in mesh with a horizontal rack 27 secured to the corresponding end plate 25. Outwardly of the pinions 26 the trunnions 23 are connected by a bearing plate 28 which secures said trunnions in turnable but non-separable relation. The cross bars 21 and 22 are thus maintained in the same relation to each other at all times, both as to their spacing, and their relative rotative positions.

Beneath the path of the slots 13 of the pans 9, the cross bar 21 is fitted with a radially projecting pitting knife 29 of substantially semi-circular shape, such knife including parallel, transversely spaced legs 30 which extend into retaining slots in the cross bar 21. The legs 30 are releasably secured to the cross bar 21 by a set screw 31 whereby said knife can be removed for sharpening or replacement.

The knife 29 normally projects forwardly in upwardly facing relation, as shown in Fig. 3; the spacing between the legs 30 being such that the knife can swing upwardly and rearwardly, upon corresponding rotation of the cross bar 21, into the slot 13 of an adjacent pan 9, without engaging the bottom plate 10 of said pan.

At one end, and preferably at both ends, of the knife pitting mechanism the corresponding bearing plate 28 is pivotally connected to a link 32 which extends rearwardly alongside the conveyor to pivotal connection, as at 33, with a radial lever 34 fixed on a cross shaft 35 turnably supported in the frame. Intermediate the ends the lever 34 is fitted with a roller 36 which rides the peripheral face of a rotary cam 37 secured on another cross shaft 38. A tension spring 39 maintains the roller 36 in engagement with the working face of the rotary cam 37.

The cross shaft 38 is driven in a direction to rotate the cam 37, in the direction indicated, by means of a chain and sprocket unit 40 which connects between said cross shaft 38 and the counter shaft 18. The drive for cam 37 is accurately timed to the advancing speed of the upper run of the conveyor 5, and said cam is formed about the periphery thereof with four cam segments, indicated on the drawings as "Starting position," "Cutting stroke," "Holding position," and "Return stroke."

When the machine is in operation, previously halved fruit—including half pits remaining therein—, which fruit halves are indicated at 41, are fed from a conveyor 42, one at a time, onto the upper run of conveyor 5, and into separate pans 9. In each pan the corresponding fruit half 41 is then manually located with the cut side lowermost and with the pit half directly over the slot 13. The stem end of each fruit 41 is abutted against the front wall 11 of the corresponding pan 9. In this position the fruit advances with the conveyor to a point directly above the pitting knife mechanism 20.

When each fruit half 41 reaches such point it is engaged, from above, by a soft-faced, relatively large-diameter roller 43 supported by a mount 44 which permits of vertical play of said roller, the latter being driven with the bottom portion thereof turning in the same direction as the direction of advance of the upper run of the conveyor 5. The roller 43 is driven from the driven conveyor cross shaft by a drive assembly including a sprocket and chain unit 45, a counter shaft 46, and a reversing belt and pulley unit 47. The roller 43 is driven at a peripheral speed slightly greater than the speed of the top run of the conveyor 5, whereby when each fruit half 41 reaches a point directly over the pitting knife mechanism 20 such roller functions not only as a hold-down means, but firmly urges the fruit-half against the front wall 11.

As each fruit-half 41 is moving toward a position directly above the pitting knife mechanism 20, the cam segment identified "Starting position" rides against the roller 36, holding the knife 29 in the position shown in Fig. 3. However, when each fruit-half 41 reaches a position directly above the pitting-knife mechanism 20, and upon engagement of said fruit-half by the roller 43, the cam segment entitled "Cutting stroke" engages the roller 36 and swings the lever 34 in a direction to advance the link 32. When this occurs the cross bars 21 and 22 are advanced to an extent to cause the same, under the influence of the rack pinions 26, to make a full half-turn, i. e., to move from the position shown in Fig. 3, through the position shown in Fig. 4, to the position of Fig. 5. With this full half-turn the knife 29 sweeps through the adjacent fruit-half 41 and about the pit 48, effectively severing the latter.

As the cross bar 21 automatically advances with the rearward half-turn cutting stroke of the knife 29, such advance—being simultaneous with advance of the upper run of the conveyor—compensates for the forward movement of the fruit-half and permits the knife to cut closely and substantially semi-circularly about the pit 48, without elongation of the cut, as would occur without such compensation. In other words, the knife 29 and the adjacent fruit-half 41 are in substantially non-moving relation to each other during the period of the cut or stroke by the knife 29.

After the cutting stroke of the knife as caused by the cam, the cam segment entitled "Holding position" engages the roller 36 and maintains the knife 29 in the position shown in Fig. 5 until the adjacent pitted fruit advances clear of the pitting knife mechanism. The pit 48, as cut from the fruit 41, tends to remain in the circular knife 29, and a push-out finger 49 is mounted on the cross bar 22; such finger being of a configuration to project through the knife 29 only when the latter turns to the holding position of Fig. 5. This is accomplished by reason of the rotary motion of cross bar 22, which occurs simultaneously with the rotary motion of cross bar 21; both of said bars turning in the same direction under the influence of the rack engaging pinions 26.

As soon as each pitted fruit-half advances away from the pitting knife mechanism 20, the cam segment entitled "Holding position" leaves the roller 36, and the cam segment entitled "Return stroke" then engages the roller, whereupon the spring 39 retracts the lever 34, resulting in simultaneous retraction of the cross bars 21 and 22, and a rotary return of the knife 29 and push-out finger 49 to their starting and separated positions, as shown in Fig. 3. With return of the parts to this position the cut-a-way pit 48 falls into a discharge 50 for disposal. At the end of the conveyor 5 the halved, and now pitted, fruit is discharged into a carry-off chute 51.

After a fruit has been pitted and moves forwardly, and upon return of the knife 29 to its starting position, as shown in Fig. 3, the "Starting position" segment of the cam then holds the knife in said position until the next following fruit-half is directly above the pitting knife mechanism, whereupon the sequence of operations is repeated.

With the above described fruit pitting machine, fruit-halves are pitted rapidly and effectively with a minimum of flesh loss occasioned by the cutting away of the pit. The cut is made cleanly, and by reason of the described arrangement can be made lengthwise of the fruit halves, as is desirable.

While this specification is drafted in terms of pitting of fruit halves, it is obvious that the machine could be used for the coring of fruit halves, such as apples, and the term "pitting" should therefore be so interpreted.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A fruit pitting machine including a pair of longitudinally disposed and transversely spaced channels, an endless chain mounted in each channel for movement therealong, means to drive the chains, fruit carrying pans supported between the chains in longitudinally spaced relation, each pan including a front wall, side walls, and a bottom plate, the bottom plate being slotted centrally and longitudinally in the direction of travel of the plate for substantially its entire length whereby when a fruit half is placed flatwise on the plate the pit will be exposed through said slot, and a pitting knife disposed at a point below the plane of the bottom plates of the pans on the top runs of the chains and operable to effect a cutting stroke through a fruit half disposed on a pan as such pan passes such point with the travel of the chains.

2. A structure as in claim 1 in which the front end of each pan is supported on the chains by cross rods journaled in the chains, the sides of the pans being provided with longitudinal slots adjacent the rear end thereof, and pins on the chains projecting into said slots.

3. A fruit pitting machine comprising endless driven chains, fruit carrying pans supported on the chains in relatively longitudinally spaced relation, each pan comprising a front wall and a bottom plate, the bottom plate being slotted centrally in the direction of travel of the plate for substantially its entire length whereby when a fruit half is placed flatwise on the plate the pit will be exposed through the slot, a pitting knife disposed at a point below the plane of the bottom plates of the pans on the top runs of the chains and operable to effect a cutting stroke through a fruit half disposed on a pan as such pan passes such point with the travel of the chains, a driven roller spaced above the pans adjacent said point and operable to engage a fruit half as its passes such point, and means driving the roller at a peripheral speed somewhat greater than the peripheral speed of the adjacent run of the chains whereby the fruit half will be pressed and held by the roller against the bottom and front wall of the pan in which it is disposed as such pan passes said point.

4. A fruit pitting machine comprising means to move fruit halves flatwise along a definite path with the pits exposed, means to cut the pit from a fruit half as the latter reaches a predetermined point in such path of travel, such latter means including a plate mounted adjacent said point for reciprocating movement from an initial starting position below the fruit, a shaft journaled in said plate, a pinion on said shaft, a gear rack mounted stationary adjacent said plate, the pinion engaging the rack, a substantially semi-circular knife fixed to the shaft and normally extending substantially parallel to the path of travel of the fruit halves when the plate is in its normal starting position, means to move the plate a predetermined distance from the starting point, the rack and pinion then rotating the shaft to effect a substantially half turn of the pitting knife through a fruit half as it passes such point and remove the pit therefrom, means to hold the plate stationary as the fruit half passes beyond such point, a second shaft journaled in the plate in longitudinally spaced relation to the first shaft, a projecting finger fixed on the second shaft and normally projecting downwardly at substantially right angles thereto, a pinion on the second shaft engaging the gear rack, such rack and pinion functioning to turn the second shaft with the first movement of the plate and project the finger through the cutting knife as the latter completes its cutting stroke, and means to simultaneously return the knife and pin to the respective starting points.

5. A fruit pitting machine comprising a continuously moving conveyor, means on said conveyor for supporting fruit halves thereon with the pits exposed downwardly through the top run of such conveyor, means to cut a pit from each fruit half as it passes a predetermined point with the travel of the conveyor, such latter means including a reciprocating carriage disposed in spaced relation beneath the top run of the conveyor at said point, a pitting knife journaled in the carriage and normally lying substantially parallel with the upper run of the conveyor, means to move the carriage from a starting point for a predetermined distance in the same direction as the conveyor is moving and as a fruit half passes said point, means to cause the knife to make a substantially half circular turn from its normal position and through the fruit half about the pit thereof during the said movement of the carriage, means to then arrest the movement of the carriage, means to then hold the carriage and knife immobile while the fruit half passes beyond said point, and means to then return the carriage to the starting point and the knife to its initial normal position, and means to push the removed pit from the pitting knife at it reaches the end of the cutting stroke, such latter means including a block journaled for movement through a half turn, and a projecting finger on the block operable to move through the pitting knife as the latter completes its cutting stroke.

CURTIS LINDLEY, Jr.

REFERENCES CITED

The following references are of record in the file of this patent:

UNITED STATES PATENTS

| Number | Name | Date |
|---|---|---|
| 800,137 | Burns | Sept. 26, 1905 |
| 1,485,403 | MacDonald et al. | Mar. 4, 1924 |
| 1,640,745 | Ayars | Aug. 30, 1927 |
| 1,769,664 | Duncan | July 1, 1930 |
| 1,953,595 | Erickson | Apr. 3, 1934 |
| 2,035,912 | Nelson | Mar. 31, 1936 |
| 2,226,664 | Jepson | Dec. 31, 1940 |
| 2,376,526 | Thompson | May 22, 1945 |
| 2,380,530 | Jepson | July 31, 1945 |

FOREIGN PATENTS

| Number | Country | Date |
|---|---|---|
| 112,506 | Australia | Feb. 20, 1941 |